United States Patent
Okamoto et al.

(10) Patent No.: US 8,290,218 B2
(45) Date of Patent: Oct. 16, 2012

(54) IMAGE PROCESSING APPARATUS (75) Inventors: Yuji Okamoto, Kyoto (JP); Naofumi Ueda, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 1036 days.

(21) Appl. No.: 12/070,017

(22) Filed: Feb. 14, 2008

(65) Prior Publication Data
US 2008/0199052 A1  Aug. 21, 2008

(30) Foreign Application Priority Data

Feb. 15, 2007  (JP) ................................ 2007-034194

(51) Int. Cl.
*G06K 9/00* (2006.01)

(52) U.S. Cl. ........ 382/115; 382/119; 382/124; 382/126; 382/144

(58) Field of Classification Search .......... 382/115–119, 382/124, 126, 144; 358/1.14, 474
See application file for complete search history.

(56) References Cited

U.S. PATENT DOCUMENTS

| | | | | |
|---|---|---|---|---|
| 5,539,523 | A * | 7/1996 | Nakai et al. ................... | 358/296 |
| 6,954,553 | B2 * | 10/2005 | Ikegami ....................... | 382/224 |
| 7,551,885 | B2 * | 6/2009 | Yaguchi ....................... | 399/368 |
| 7,574,739 | B2 * | 8/2009 | Shirakawa ................... | 726/19 |
| 2002/0048390 | A1 * | 4/2002 | Ikegami ....................... | 382/124 |
| 2003/0031341 | A1 * | 2/2003 | Rhoads ......................... | 382/100 |
| 2005/0012967 | A1 * | 1/2005 | Okamura ...................... | 358/474 |
| 2005/0041263 | A1 * | 2/2005 | Ishikawa et al. ............. | 358/1.14 |
| 2005/0071637 | A1 * | 3/2005 | Shirakawa ..................... | 713/170 |
| 2006/0279763 | A1 | 12/2006 | Tamura et al. | |
| 2007/0008570 | A1 * | 1/2007 | Okamoto et al. ............ | 358/1.14 |
| 2007/0047008 | A1 * | 3/2007 | Graham et al. ............... | 358/401 |
| 2007/0101164 | A1 * | 5/2007 | Ando et al. ................... | 713/193 |
| 2007/0102764 | A1 * | 5/2007 | Ando et al. ................... | 257/355 |
| 2007/0159648 | A1 * | 7/2007 | Takashima ................... | 358/1.14 |
| 2007/0175998 | A1 * | 8/2007 | Lev .............................. | 235/454 |

FOREIGN PATENT DOCUMENTS

| | | |
|---|---|---|
| JP | 06-214862 | 8/1994 |
| JP | 09-204481 | 8/1997 |
| JP | 2001-231619 | 8/2001 |
| JP | 2003-025684 | 1/2003 |
| JP | 2004-245962 | 9/2004 |
| JP | 2005-323206 | 11/2005 |
| JP | 2007-074088 | 3/2007 |

* cited by examiner

*Primary Examiner* — Vu Le
*Assistant Examiner* — Aklilu Woldemariam
(74) *Attorney, Agent, or Firm* — David G. Conlin; Steven M. Jensen; Edwards Wildman Palmer LLP (57) ABSTRACT

When an information medium is copied, information is printed while preventing personal information from leaking. An image scanning section 2 scans the information medium and inputs the image. An identification section 64 calculates the size of the information medium from the inputted image and identifies the type of the information medium. The position of the unique image indicating personal information is fixed according to the information medium. An area determination section 63 identifies the unique image in the information medium and determines the position of the specific area in which the unique image exists in the inputted image. A control section 7 performs image processing for masking the specific area. An image forming section 3 prints the image in a state in which the unique image is hidden.

10 Claims, 7 Drawing Sheets

FRONT SIDE OF CREDIT CARD

BACK SIDE OF CREDIT CARD

FIG. 4

FRONT SIDE OF CASH CARD

BACK SIDE OF CASH CARD

FIG. 5

FRONT SIDE OF INSURANCE CARD

BACK SIDE OF INSURANCE CARD

FIG. 6

SURFACE OF INSURANCE CERTIFICATE

IMAGE PROCESSING APPARATUS

BACKGROUND OF THE INVENTION

1. Field of the Invention

The present invention relates to an image processing apparatus having a protect function to protect against copying of an information medium such as a credit card and a license certificate in which personal information is recorded.

2. Description of the Related Art

Personal information such as a card number, his or her facial photograph and full name is recorded in an information medium such as a credit card, a driver's license, an insurance certificate and a passport. Such an information medium is also used to identify a person's status. For example, the information medium is copied and a unique image indicating personal information is printed on a recording sheet. This recording sheet is used to confirm the person's identity.

The unique image is recorded as is in the recording sheet in which the information medium is copied. Therefore, if a third person obtains this recording sheet, personal information may be leaked, resulting in a possibility that the personal information may be misused.

Japanese Patent Laid Open No. 2001-231619 discloses a holder capable of masking personal information recorded on an information medium. When the information medium contained in the holder is copied, the image is printed with the unique image in a predetermined position hidden.

On the other hand, an image processing apparatus for copying an information medium restricts copying of a document by judging whether or not the document is copy restricted as disclosed in Japanese Patent Laid Open No. 2004-245962. In this case, the copy-restricted document is a special document such as a document on which an image is printed in magnetic ink or a document on which a resonant circuit is formed.

However, the above image processing apparatus cannot identify the information medium such as a credit card as a copy-restricted document. Therefore, a unique image scanned from the surface of the information medium is copied as is. In other words, the image processing apparatus does not have a protect function to prevent personal information from leaking when the information medium is copied. In order to prevent personal information from being copied unnecessarily, a holder as mentioned above must be used, but the use of a holder is troublesome for the user.

In view of the above, it is an object of the present invention to provide an image processing apparatus capable of preventing personal information from leaking by inhibiting a unique image indicating personal information from being printed when the information medium is copied.

SUMMARY OF THE INVENTION

The present invention comprises an input section for inputting an image having a unique image from an information medium; a control section for performing image processing on an inputted image and outputting the image; and an area determination section for determining a specific area in which a unique image exists, wherein the control section performs image processing for masking the specific area.

A unique image in an information medium refers to an image indicating personal information. The unique image is hidden by masking the specific area. In other words, when processing such as copying is performed on the unique image in an information medium, the image is outputted in a state where the unique image is hidden. Accordingly, personal information does not appear in the outputted image, and thus the personal information will not be leaked.

An identification section is provided to identify the type of an information medium. The area determination section is provided to determine a specific area according to the type of the information medium. The specific area is determined according to the type of the information medium. Therefore, when the type of the information medium is identified, the area determination section can determine the specific area and determines the position of the specific area in the inputted image. The control section masks the specific area in the inputted image.

The identification section obtains information on the size of an information medium and identifies the type of the information medium. The information medium differs in size depending on the type thereof. Thus, the identification section obtains information on the size of an information medium by detecting the size of the information medium from an inputted image or by using the directly inputted size of the information medium.

A display section is provided to display a specific area, and the specific area displayed on the display section is changeable. The control section masks the specific area that has been changed. The display section displays an inputted image. This image also contains a unique image. The specific area determined by the area determination section may not completely cover the entire area containing the inputted unique image. In this case, modifications such as a move and a zoom in/out are performed to completely hide the unique image.

The area determination section determines the specific area to be masked according to the security level. On the basis of this determination, the control section masks the specific area containing all the unique images in the information medium or only the specific area containing some of the unique images in the information medium. The higher the security level, the more specific areas to be masked, and the prevention of personal information leaks is performed rigorously. When the security level is low, only part of the specific area is masked, and disclosure of not so important personal information is permitted.

The security level is changeable after an image is inputted. When the security level is changed, the area determination section changes the specific area to be masked. A need to change the security level occurs depending on the purpose of using the personal information recorded in the information medium. To meet this need, only the necessary personal information can be obtained by making the security level changeable.

The security level of a unique image is assigned according to the type of the information medium, and the area determination section determines the specific area according to the security level of the unique image. The personal information recorded in the information medium differs in importance depending on the type of the information medium. Thus, the security level is assigned in advance for each unique image. The area determination section determines a specific area to be masked and a specific area not required to be masked according to the security level of the unique image.

An authentication section is provided to authenticate the user, and the security level is assigned according to the user. The security level of a user having an authority is increased. The area determination section determines the specific area to be masked according to the security level of the user. The higher the security level, the less the specific area to be masked; the lower the security level, the more the specific area to be masked to prevent personal information from leaking unnecessarily.

The specific area can be determined rigorously by considering the security level of the user and the security level of the unique image. The area determination section determines the specific area based on the security level of the user or the security level of the unique image, whichever is higher. In this way, the unique image related to necessary personal information is not hidden, and the unique image related to unnecessary personal information is hidden, thereby preventing personal information from leaking unnecessarily.

When image processing of masking the specific area is performed, the control section prohibits the creation of log information related to this processing. In addition, when the image processing of masking the specific area is performed, the control section prohibits the saving of an image containing the inputted unique image. When this image processing is performed, the image containing the unique image is inputted. When log information is created, the inputted unique image may be stored as log information. In addition, in a filing of saving an image, all the inputted images are stored. Because of this, storing a unique image may lead to a possibility that personal information may be leaked. Thus, the creation of log information and filing are prohibited, thereby preventing personal information from leaking.

Here, the information medium includes a license card and other cards having an image indicating personal information as a unique image on the surface thereof. An input section inputs an image by scanning the surface of the information medium. Additionally, when the front side and the back side of the information medium contain an image, the input section scans both sides and inputs the images. Then, the control section synthesizes the images on both sides and outputs the two images side by side.

According to the present invention, when an image containing personal information recorded on an information medium is outputted by copying the information medium, the image is outputted by masking the specific area containing the unique image. This assures that the image is outputted in a state where the unique image is hidden. In other words, the personal information is not visible, thereby preventing personal information from leaking unnecessarily.

DETAILED DESCRIPTION OF THE PREFERRED EMBODIMENTS

Figure 1:
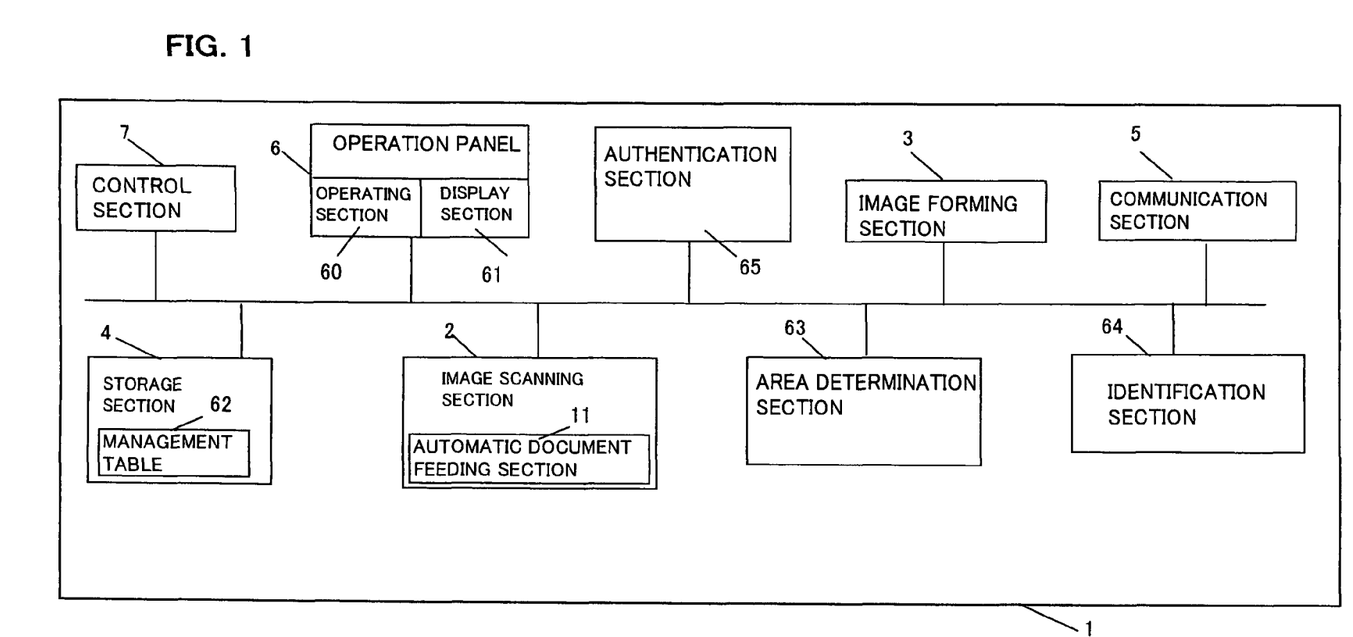
FIG. 1 is a control block diagram of an image processing apparatus of the present invention.

FIG. 1 shows an image processing apparatus of the present embodiment of the invention. The image processing apparatus is a complex apparatus for performing a copy mode, a print mode, a scanner mode, and a facsimile mode. A cabinet 1 of the image processing apparatus includes an image scanning section 2 which scans a document and inputs image data; an image forming section 3 which processes the image data and prints; a storage section 4 which stores the image data; a communication section 5 which communicates with external apparatuses; an operation panel 6 for input operation; and a control section 7 which controls a processing section for executing image data processing according to a mode. It should be noted that the processing section, which performs processing to output the inputted image data, is configured to include the image forming section 3, the storage section 4 and the communication section 5.

Figure 2:
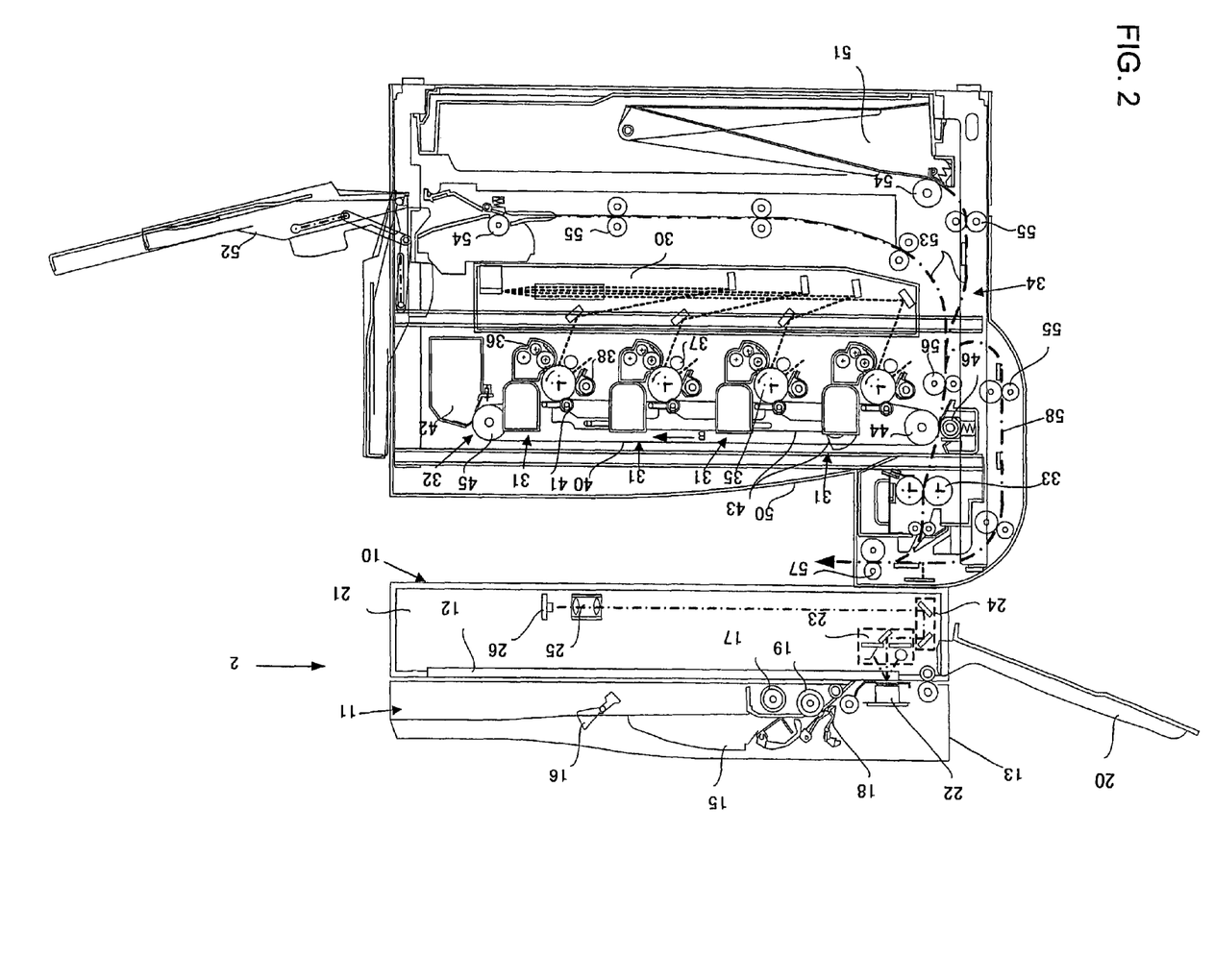
FIG. 2 schematically illustrates a general configuration of the image processing apparatus.

As shown in FIG. 2, the image scanning section 2 is disposed above the cabinet 1 and includes a scanner section 10 and an automatic document feeding section 11. The automatic document feeding section 11 is positioned above the scanner section 10 and automatically feeds a document to scan image data of the document.

A document table 12 made of platen glass is disposed on the upper surface of the cabinet 1, and a document cover 13 for covering the document table 12 is disposed thereon. The automatic document feeding section 11 is integrally mounted on the document cover 13. The document cover 13 can be freely opened and closed. When the document cover 13 is closed, the automatic document feeding section 11 feeds a document. While the document cover 13 is being opened, a document can be placed on the document table 12. A cover open/close sensor detects whether the document cover 13 is opened or closed. Additionally, a document size detecting sensor is provided to detect the size of a document placed on the document table 12.

When a document is placed on a document set tray 15 of the automatic document feeding section 11, a document detection sensor 16 detects that the document is placed. Then, a copy condition such as the size and the scaling factor of a recoding sheet to be printed is entered from the operation panel 6. Thereafter, scanning of an image on the document starts by an input operation of the start key.

A pickup roller 17 in the automatic document feeding section 11 picks up a document one sheet at a time from the document set tray 15. A document is conveyed through between a stacking plate 18 and a carrying roller 19 to the document table 12. The document is conveyed in a vertical scanning direction on the document table 12 and is discharged onto a document discharge tray 20. The document discharge tray 20 is provided with a document ejection sensor, which detects whether there is a document on the document discharge tray 20.

The scanner section 10 is provided with a first scanning section 21 and a second scanning section 22. A scanning area is formed at one side of the document table 12. When a document is conveyed onto the document table 12, the document passes the scanning area. A first scanning unit 23 of the first scanning section 21 is positioned below the scanning area and the surface (back side) of the document is scanned.

When the automatic document feeding section 11 conveys the document onto the document table 12, the first scanning unit 23 moves to a scanning position to be fixed therein and the second scanning unit 24 is also fixed at a predetermined position. An exposure lamp of the first scanning unit 23 irradiates the surface of the document from under the document table 12. The light reflected from the document is guided to an image forming lens 25 by each reflecting mirror of the first scanning unit 23 and the second scanning unit 24. The image forming lens 25 focuses the light reflected from the document onto a CCD 26. Then, the image on the surface of the document is formed on the CCD 26. Thereby, the image on the surface of the document is scanned.

In addition, the second scanning section 22 scans the reverse surface (upper side) of the document. The second scanning section 22, which is disposed above the document table 12, includes an LED for irradiating the reverse surface of the document; an exposure lamp array having a fluorescent lamp and the like; a SELFOC lens array for collecting light reflected from the document for each pixel; a contact image sensor (CIS) which receives light reflected from the document through the SELFOC lens array, and performs photoelectric conversion on the light to output an analog image signal, and the like. Thereby, the image on the reverse surface of the fed document is scanned.

When a document is placed on the document table 12, the first scanning section 21 scans the surface of the document. The first and second scanning units 23 and 24 move in the vertical scanning direction while mutually maintaining predetermined speed relationship. The first scanning unit 23 exposes the document on the document table 12 to radiation, and the first and second scanning units 23 and 24 guide the light reflected from the document toward the image forming lens 25. The image forming lens 25 focuses the image of the document onto the CCD 26.

When a single side or both sides of the image of the document is scanned in this way, the single side or both sides of the image are inputted to the control section 7. The control section 7 has an image processing section which performs various kinds of processing on image data. The image data is outputted to the image forming section 3.

The image forming section 3 prints a color image or a monochrome image on a recording sheet based on the inputted image data. The image forming section 3 includes a laser scanning unit 30, four image stations 31, an intermediate transfer belt unit 32, a fixing apparatus 33, and a carrying apparatus 34.

Each image station 31 forms a color image according to each of the colors: black, cyan, magenta, and yellow. Each image station 31 includes a photoconductor drum 35, a developing apparatus 36, a charging apparatus 37, a cleaning apparatus 38, and a destaticizing apparatus (not shown).

The photoconductor drum 35 is rotatably driven unidirectionally. The cleaning apparatus 38 cleans residual toner from the surface of the photoconductor drum 35. The destaticizing apparatus removes charges on the surface of the photoconductor drum 35. The charging apparatus 37 uniformly charges the surface of the photoconductor drum 35.

The laser scanning unit 30 modulates a laser beam based on the image data inputted from the image scanning section and the like, and uses the modulated laser beam to repeatedly scan the surface of the photoconductor drum 35 in a horizontal scanning direction and form an electrostatic latent image on the surface of the photoconductor drum 35. The developing apparatus 36 supplies toner on the surface of the photoconductor drum 35, develops the electrostatic latent image, and forms a toner image on the surface of the photoconductor drum 35.

The intermediate transfer belt unit 32 includes an intermediate transfer belt 40, an intermediate transfer roller 41, a transfer belt cleaning apparatus 42, and a tension mechanism 43. The intermediate transfer roller 41 is disposed above each photoconductor drum 35 and is wound around a drive roller 44 and a driver roller 45 so as to rotate in an arrow B direction.

The intermediate transfer roller 41 is disposed opposite the photoconductor drum 35 by sandwiching the intermediate transfer belt 40, and has a transfer bias voltage applied thereto. When a voltage with the polarity reverse to that of the toner is applied to the intermediate transfer roller 41, the toner image on the surface of the photoconductor drum 35 is transferred to the intermediate transfer belt 40. Toner images of each color are laminated and a synthesized multi-color toner image is formed.

The intermediate transfer roller 41 is disposed in pressure-contact with the intermediate transfer belt 40 and a voltage with the polarity reverse to that of the toner is applied. The transfer roller 46 transfers the toner image on the intermediate transfer belt 40 onto a recording sheet conveyed between the transfer roller 46 and the intermediate transfer belt 40. The transfer belt cleaning apparatus 42 removes toner remaining on the intermediate transfer belt 40.

The toner image transferred to the recording sheet is heated and pressurized and then is fixed to the recording sheet by fixing apparatus 33. Thereby the image is formed on the recording sheet. The recording sheet on which the image is printed in this way is discharged onto a discharge tray 50 disposed on the upper portion of the cabinet 1.

The carrying apparatus 34 conveys the recording sheet along a carrying path 53 from a sheet cassette 51 or a manual tray 52. The carrying path 53 goes between the intermediate transfer belt 40 and the transfer roller 46, passes through the fixing apparatus 33 and reaches the discharge tray 50.

The carrying apparatus 34 includes a pickup roller 54, a feeding roller 55, a resist roller 56, and a discharge roller 57. A recording sheet on the sheet cassette 51 or the manual tray 52 is guided sheet by sheet to the carrying path 53, conveyed along the carrying path 53 and discharged to the discharge tray 50. While the recording sheet is being conveyed, the image is printed on the recording sheet. Additionally, a switchback carrying path 58 is provided for double-sided printing. The recording sheet that has been fixed passes through the feeding roller 55, goes along the switchback carrying path 58, and is conveyed between the intermediate transfer belt 40 and the transfer roller 46. The recording sheet with both sides printed goes through the fixing apparatus 33 and is discharged to the discharge tray 50.

The operation panel 6 is disposed in the scanner section 10 and includes an operating section 60 and a display section 61. The operating section 60 is provided with various operation keys. The display section 61 is made of a liquid crystal display and is configured as a touch panel. Touch keys are formed in an operation screen displayed on the display section 61 and these touch keys also serve as the operation keys.

The communication section 5 has a communication interface which is connected to a network such as LAN and WAN. A plurality of external apparatuses are connected to the network. Examples of the external apparatus include other image processing apparatuses, information processing apparatuses such as personal computers, and servers. The network is connected from a router to the Internet through a communication line such as a telephone line and an optical fiber. The communication section 5 is configured to be communicable with the external apparatus through the network by a predetermined communication protocol. Additionally, the image processing apparatuses are also configured to be communicable with each other. It should be noted that communication within the network may be wired or wireless. These image processing apparatuses and external apparatuses constitute the image processing system.

In addition, the communication section 5 is provided with a modem apparatus. A telephone line is connected to the modem apparatus. The image processing apparatus is capable of performing facsimile communication. The image processing apparatus is also capable of performing data communication by Internet facsimile through the network. Further, the communication section 5 is also provided with a communication terminal and a communication card for wireless communication. A storage medium such as a USB memory and an IC card is connected to the communication terminal. The communication section 5 sends and receives data to and from the storage medium. Additionally, the communication section 5 also sends and receives data by wireless communication to and from a communication terminal such as a cell phone and a personal digital assistant (PDA) through a communication card.

The storage section 4 is made of a hard disk drive. The storage section 4 stores image data inputted from the image scanning section 2 or image data inputted from the communication section 5. The inputted image data is temporarily stored in an image memory such as a dynamic random access memory (DRAM), undergoes image processing and cryptographic processing, and then is transferred from the image memory to the storage section 4. In addition, when image data is read from the storage section 4, the image data undergoes image processing and cryptographic processing and then is stored in the image memory. Thereafter, the image data is outputted externally according to the processing to be executed such as printing, data transmission, and facsimile communication.

The storage section 4 has a management table 62 which stores information necessary for operating the image processing apparatus, such as control information, setting information and user authentication information of the image processing apparatus. When these pieces of information are created or changed, the information stored in the management table 62 is updated. It should be noted that the management table 62 may be disposed in a nonvolatile memory other than the storage section 4.

The control section 7 is made of a microcomputer having a CPU, a ROM, and a RAM. The CPU reads a control program stored in the ROM into the RAM and executes the control program. Each section operates according to the control program. When image data is inputted from the input section such as the image scanning section 2 and the communication section 5, one of the modes: a print mode, a copy mode, a scanner mode, and a facsimile mode, is executed on the basis of the processing condition contained in the information inputted from the operating section 60 and in the header information of the image data inputted from an external apparatus. In addition, the control program includes a browser and mail software. The control section 7 sends and receives data or email to and from the external apparatus by a communication protocol such as a TCP/IP protocol.

The control section 7 temporarily stores the inputted image data in the storage section 4 when performing each mode. Additionally, the control section 7 executes a filing mode in which the inputted image data is stored in the storage section 4 for management. The stored image data is re-outputted according to the instructed processing.

The outputted image data is erased from the storage section 4 by an instruction from the control section 7. Here, the erasing is performed by overwriting the image data with random data to invalidate the image data so that the image data cannot be restored. In this way, invalidation processing and subsequent cryptographic processing are performed on the image data to prevent unauthorized use thereof.

Figure 3:
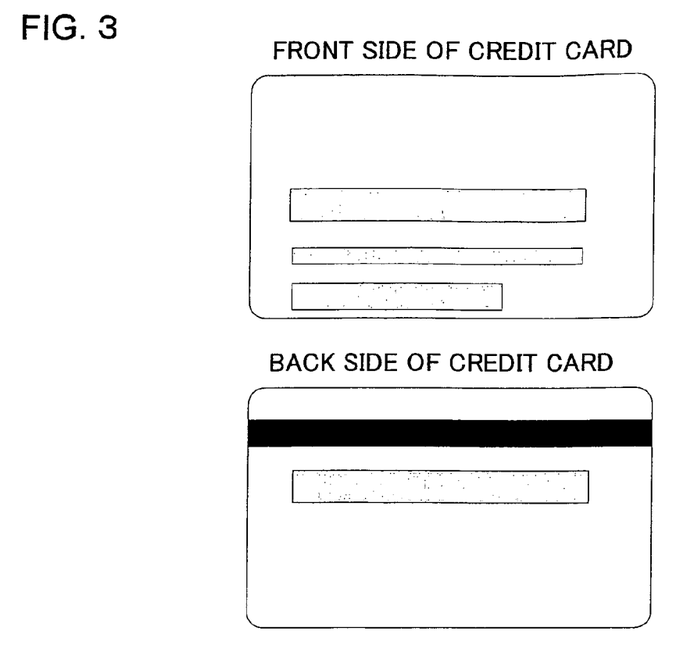
FIG. 3 shows the front side and the back side of a credit card.
Figure 4:
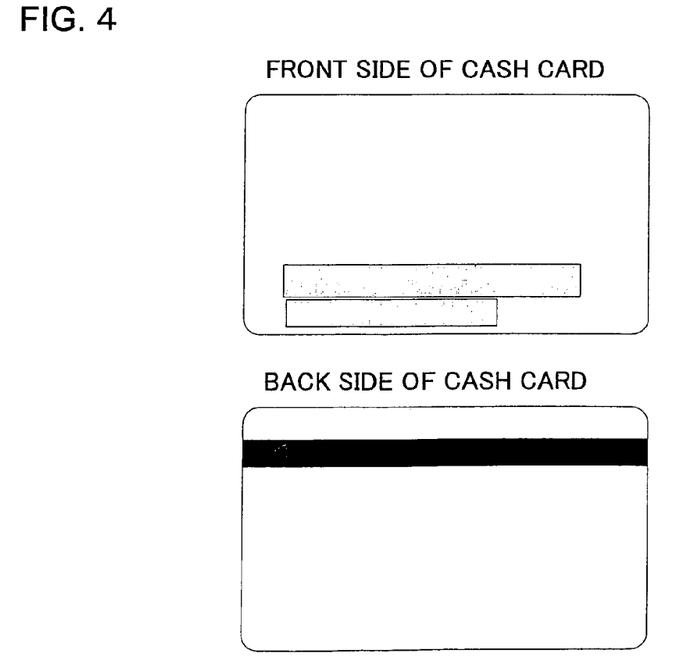
FIG. 4 shows the front side and the back side of a cash card.
Figure 5:
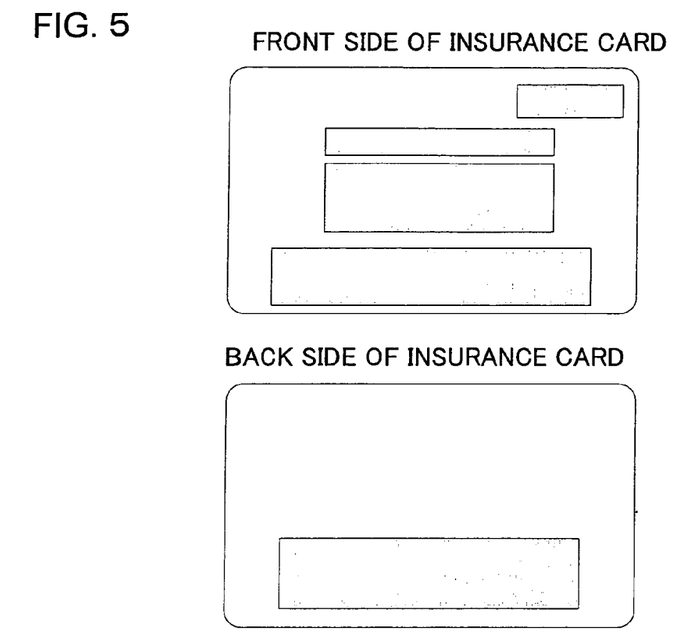
FIG. 5 shows the front side and the back side of an insurance card.
Figure 6:
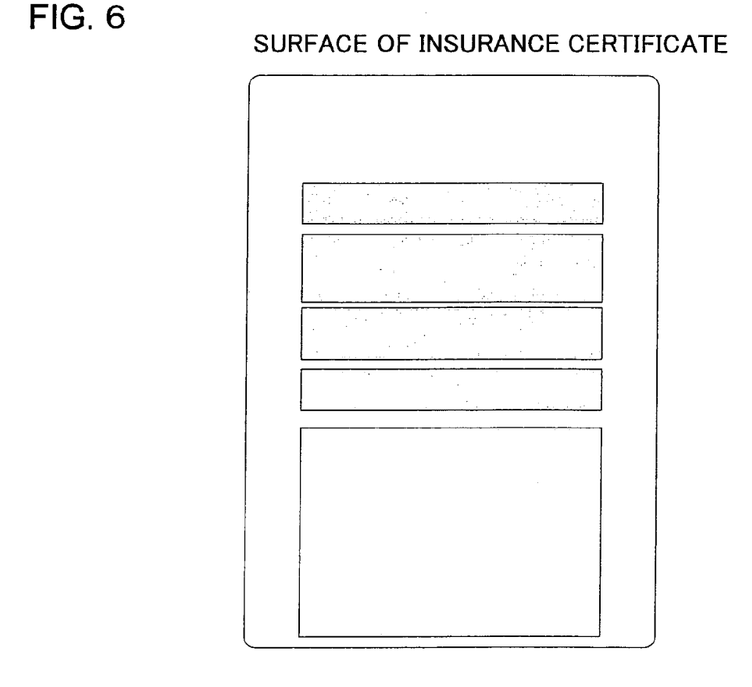
FIG. 6 shows the surface of the insurance certificate.

Here, personal information is described in an information medium such as a credit card, a driver's license, an insurance certificate, a basic resident register, and the like. For example, as shown in FIG. 3, a credit card contains a card number, an expiry date, and a full name on the front side thereof, and a signature on the back side thereof. As shown in FIG. 4, a cash card contains a card number and a full name on the front side thereof. As shown in FIG. 5, an insurance card contains an expiry date, a symbol, a full name, and a birth date on the front side thereof, and an address on the back side thereof. As shown in FIG. 6, an insurance certificate contains a symbol, a full name, and a birth date on the front side thereof. A driver's license card contains a full name, a birth date, an address, and a place of registry on the front side thereof. A passport contains a full name, a birth date, an address, and a facial photograph.

As described above, the unique image is formed as an image indicating personal information on the front side and even the back side of various kinds of information media. A specific area in which the unique image exists is determined for each information medium. It should be noted that a plurality of unique images are formed in an information medium and there are a plurality of specific areas.

The image processing apparatus in accordance with the present invention is provided with a protect function to prevent personal information from unnecessarily leaking when an image in the information medium is processed. More specifically, as shown in FIG. 1, the image processing apparatus includes an area determination section 63 for determining a specific area and an identification section 64 for identifying type of a specific area when an image containing a unique image is inputted from the input section. The operations of the area determination section 63 and the identification section 64 are controlled by the control section 7. The control section 7 performs image processing of masking the specific area when performing image processing on the inputted image and outputting the image.

The identification section 64 obtains information on the size of an information medium and identifies the type of the information medium. The size of an information medium is determined by the type thereof. The management table 62 stores in advance information medium management information on the size of an information medium for each type thereof, the shape of the unique image, and the position of the specific area. When the image scanning section 2 scans the information medium, the identification section 64 recognizes the circumference of the information medium from the inputted image and calculates the size of the information medium. At this time, the control section 7 recognizes that the image of the information medium is inputted and executes the protect function. The identification section 64 refers to the information medium management information and identifies the type of the information medium based on the obtained size. Alternatively, the user inputs the size through the operating section 60. Thus, the size of the information medium can also be obtained, and the identification section 64 identifies the type of the information medium based on the inputted size.

Here, for example, the credit card and the cash card are the same in size. As such, information media different in type may be the same in size. However, the unique images differ in shape and position for each information medium. Thus, the identification section 64 extracts the unique image from the inputted image and recognizes its shape and position. Then, the identification section 64 identifies the type of the information medium by referring to the information medium management information.

The area determination section 63 determines the specific area based on the type of the information medium. The type of an information medium corresponds to the specific area thereof. The area determination section 63 determines the specific area in the information medium by referring to the information medium management information. Here, the position of the circumference is known by the image of the inputted information medium. The specific area is positionally fixed relative to the circumference. Therefore, the area determination section 63 can determine the position of the specific area in the inputted image.

The control section 7 performs image processing for masking the specific area by instructing the image scanning section to fill the specific area with a solid image or to overwrite the specific area with another image.

The image data which underwent such image processing is outputted to the image forming section 3 in which the image with the unique image hidden is printed and is outputted outside. It should be noted that instead of printing, the image data may be outputted to the communication section 5 which outputs the image data to an external apparatus by data communication. The external apparatus displays or prints the image with the unique image hidden.

Thus, when the image processing apparatus scans the information medium in which the unique image such as personal information is recorded, the image is outputted in a state where the unique image is unknown. Accordingly, even if a third person tries to copy the information medium and take out the personal information, the unique image related to personal information is hiddenly outputted, thereby preventing the personal information from leaking.

Figure 7:
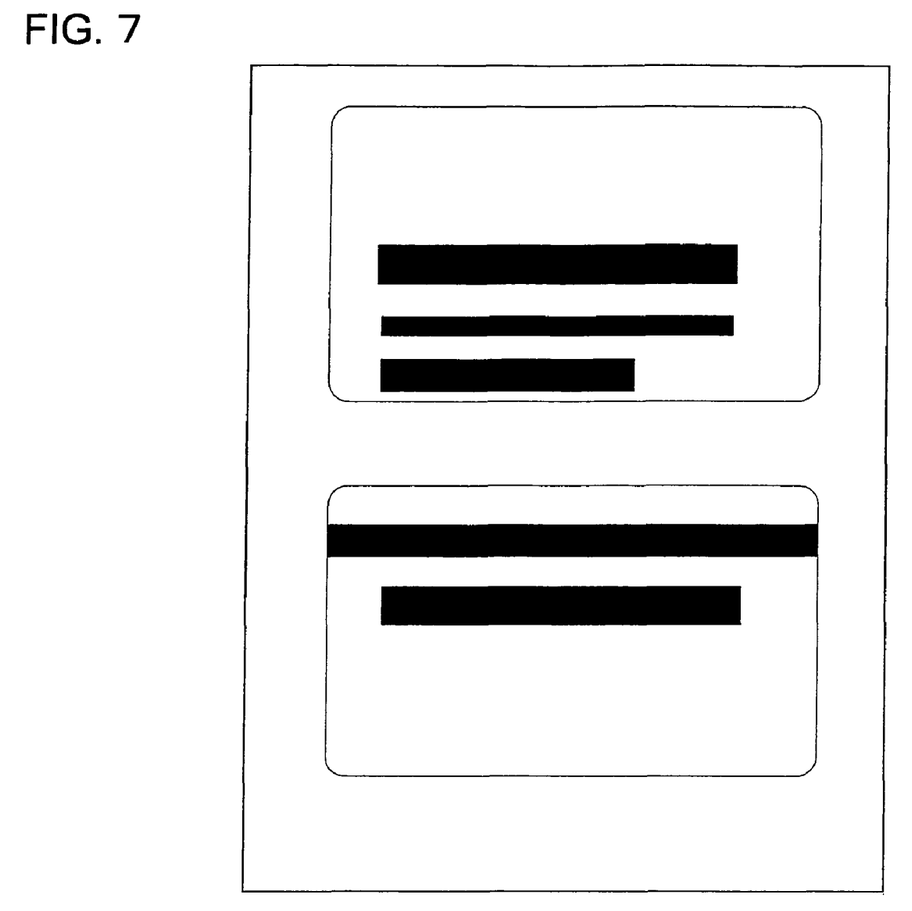
FIG. 7 shows an image which is outputted with personal information of the credit card hidden.

In addition, the image processing apparatus has a function to scan images from the front and back sides of the information medium, synthesize the images of the front and back sides, and outputs the images side by side onto one page. Here, this function is referred to as the card shot function. When the card shot function is instructed, the control section 7 executes the aforementioned protect function automatically. Thereby, as shown in FIG. 7, the two images with the unique images hidden are outputted side by side on one page. If the information medium contains one image only on a single side thereof and when the card shot function is executed, one image of the single side is outputted on one page.

Here, there is the case where someone concerned including the person himself or herself wants to copy the information medium to identify the person. In order to meet such a need, the area determination section 63 determines the specific area according to the security level. The specific area determined in this way is masked. The higher the security level, the more the specific area to be masked. The lower the security level, the less the specific area to be masked.

The image processing apparatus is provided with an authentication section 65 which authenticates the user. The security level is assigned according to the user. When authentication information such as ID information, a password, and biological information is inputted, the authentication section 65 determines the user based on these pieces of information. Then, the authentication section 65 authenticates the user based on the user information that has been registered in advance. The user information includes a security level determined for each user. The higher the authority of the user, the higher the security level. The lower the authority of the user, the lower the security level. The processing on the inputted image is controlled according to the security level.

In addition, the security level is also assigned to the unique image. The personal information recorded in an information medium includes information which will cause a problem if leaked, and information which will not cause a serious problem even if leaked. The more important the personal information the unique image has, the higher the security level is assigned. Thus, the security level is determined for each unique image of the information medium and the security level is stored in advance in the information medium management information for each unique image. It is determined according to the security level whether to mask or not.

The area determination section 63 determines the specific area according to the security level of the user and the security level of the unique image. More specifically, the area determination section 63 compares the security level of the user and the security level of the unique image and determines the specific area to be masked according to the security level whichever higher. When the information medium contains a plurality of unique images, some of the unique images are selected according to the security level, and the specific area containing the unique images is determined as the specific area to be masked. On the other hand, the remaining unique images that were not selected are not masked.

Figure 8:
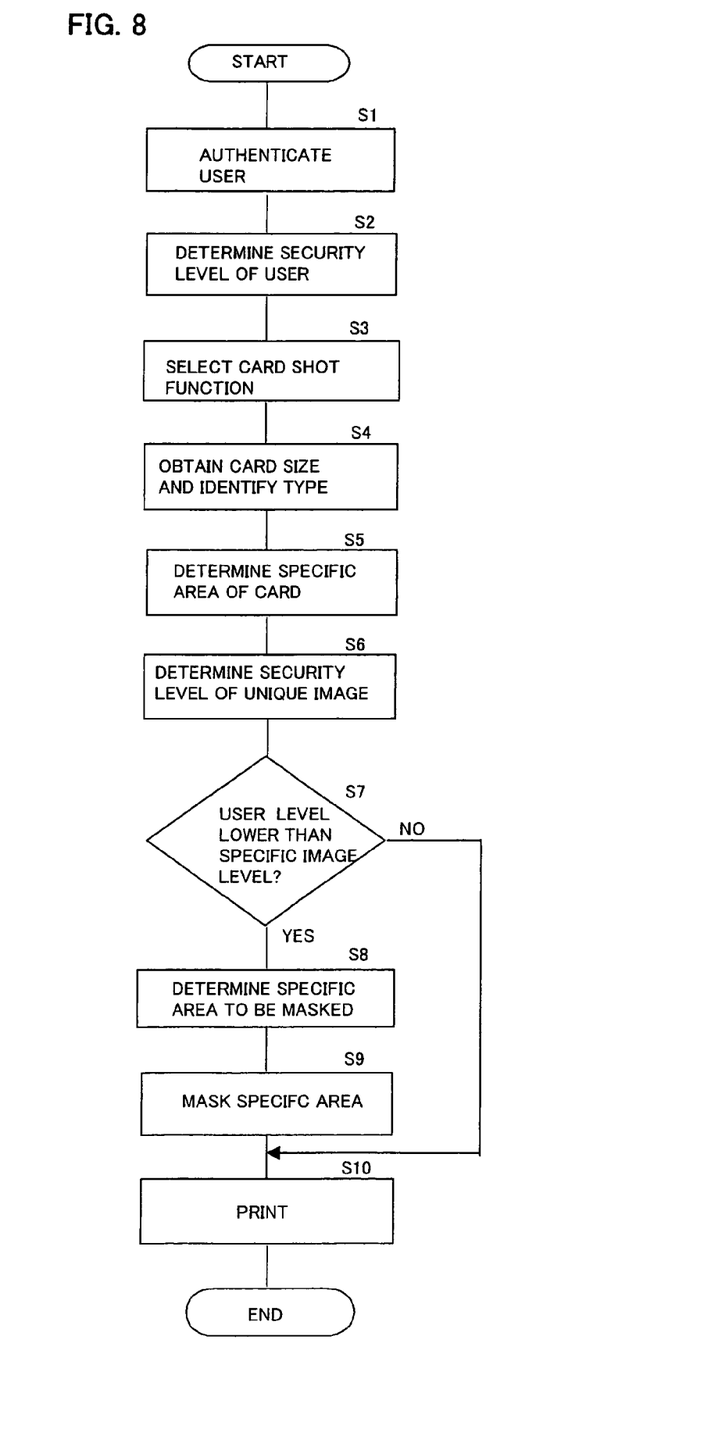
FIG. 8 is a flowchart showing the procedure of the card shot function.

With reference to FIG. 8, the operation of performing the card shot function will be described. Now, assume that a credit card is to be copied. First, the user operates the image processing apparatus to enter ID information and authentication information. The authentication section 65 recognizes these pieces of information to authenticate the user (S1). Then, the authentication section 65 determines the security level of the user based on the user information (S2). If the user has not been registered, the user is not authenticated and the operation of the image processing apparatus is restricted to a limited use.

The user places a credit card on the document table 12 and selects the card shot function by the operating section 60 (S3). When the user operates the start key, the image scanning section 2 scans the front side of the credit card. Then, the user reverses the credit card and places the credit card on the document table 12. When the user operates the start key, the image scanning section 2 scans the back side of the credit card.

The identification section 64 calculates the size of the scanned credit card based on the inputted image. Then, the identification section 64 identifies the type of the information medium corresponding to this size by referring to the information medium management information (S4). As a result, the credit card is identified.

When the credit card is identified, the area determination section 63 uses the information medium management information to recognize the position of the specific area in the credit card, allot the position to the inputted image, and determine the specific area (S5).

The area determination section 63 reads the security level of the user from the user information (S6). Additionally, the area determination section 63 also reads the security level of the unique image from the information medium management information. Then, the area determination section 63 compares both security levels (S7).

When the security level of the user is higher than the security level of the unique image, the processing according to the security level of the user is performed. More specifically, when the security level of the user is higher than the security level of the unique image, the control section 7 judges that the user has the same authority as the manager, and outputs the image to the image scanning section 2 without masking the specific area. Thus, the inputted image is printed as is (S10).

When the security level of the unique image is higher than the security level of the user, the area determination section 63 determines the specific area to be masked (S8). Then, the control section 7 performs image processing for masking the specific area (S9). Then, the image scanning section 2 prints the image (S10).

Here, the specific area is determined so as to mask the specific area covering all the unique images in one credit card.

Instead of this, the area determination section 63 may determine the specific area by judging whether to mask individual image for each unique image.

The area determination section 63 determines the specific area to be masked and the specific area not to be masked by comparing the security level of the unique image and the security level of the user for each unique image. Based on this determination, the control section 7 masks some of the specific areas and does not mask the remaining specific areas. For example, the specific area containing the unique image indicating the card number is masked and the specific area containing the unique image indicating the expiry date is not masked. Alternatively, the specific area covering the last 4 digits of the card number is masked and the specific area covering the digits other than the last 4 digits of the card number is not masked. Additionally, even if the security level of the unique image is the same, the specific area to be masked is different depending on the user. If the user has a high security level, the specific area covering the name is masked. If the user has a low security level, the specific area covering not only the name but also the card number is masked.

In this way, a part of the unique image is outputted hiddenly by masking the specific area corresponding to each unique image according to the security level. Accordingly, it is possible to provide personal information necessary for identifying the person herself or himself, and at the same time to prevent personal information from leaking unnecessary by hiding personal information.

By the way, for example, even the same type of information medium may have a different number of digits of the card number or a long name or address. In this case, the specific area containing the real unique image may be larger than the predetermined specific area. Thus, the area determination section 63 is configured to be able to change the specific area.

Figure 9:
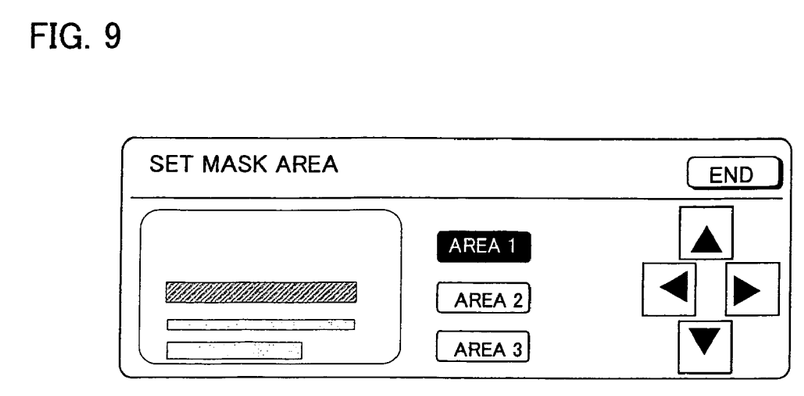
FIG. 9 is a setup screen for changing a specific area.

When the specific area corresponding to the inputted image is determined, an area setup screen is displayed on display section 61 as shown in FIG. 9. Not only the unique image and the specific area but also change keys are displayed on this screen. Each specific area can be moved and zoomed in/out on the display section 61. When a specific area is selected, the specific area is moved or zoomed in/out by the operation of change keys. However, the change of the specific area is restricted. The amount of move and the zoom in/out ratio is restricted within each of the predermined range. This restriction of the amount of change can prevent the unique image within the specific area from spreading beyond the specific area.

When the change of the specific area is completed, the area determination section 63 updates the information on the position of the specific area containing the inputted image. The control section 7 performs image processing for masking the changed specific area. Accordingly, the unique image can be securely hidden by changing the specific area so as to cover the unique image, thereby preventing personal information from leaking.

In addition, the security level of a unique image is configured to be changeable. A security level is assigned in advance to each of the unique images in the information medium. However, there may be cases where a unique image must be hidden or displayed to suit the needs of the user.

Figure 10:
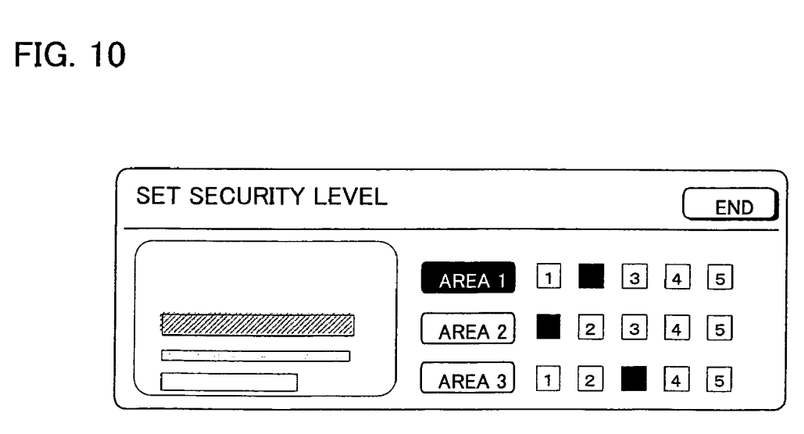
FIG. 10 is a setup screen for changing a security level.

Accordingly, after the image is inputted, the control section 7 changes the security level of the unique image as instructed by the user. A security level setup screen is displayed in the display section 61 as shown in FIG. 10. Not only the unique image and the specific area but also security level keys are displayed on this screen. A plurality of security level keys are provided for each specific area. The user selects a specific area and selects any security level thereof. The control section 7 temporarily changes the security level of the unique image corresponding to the specific area. The area determination section 63 determines whether to mask the specific area or not on the basis of the changed security level of the unique image and the security level of the user.

When the security level of the unique image is increased, the specific area which usually should not be masked is masked. On the contrary, when the security level of the unique image is lowered, the specific area which is usually masked is not masked. Accordingly, the unique image can be hidden as needed, thereby preventing personal information from leaking unnecessarily.

It is desirable that a person capable of changing the security level should be restricted to a user having an authority above a predetermined security level. For example, the user is restricted to a person having an authority above the security level of the unique image. If all users can change the security level, a third party may copy the unique image in the information medium without being hidden, leading to a security problem. Therefore, restriction is needed to eliminate such a problem. Additionally, the above describes a temporary change of the security level, but usual change means setting/ setup change of settings which must be restricted to an authorized user. When this change occurs, information medium management information is updated.

When the image processing apparatus performs processing on the inputted image, the control section 7 creates log information related to the processing and stores the log information in the storage section 4. The inputted image is added to this log information and the image data of the unique image is stored therein. However, when the card shot function is executed, the control section 7 prohibits the creation of log information from the point of view of protecting personal information.

Thereby, when the image of the information medium is processed, log information is not created. Additionally, when the processing is completed, the image inputted from the information medium is erased from the storage section 4 and the memory. Therefore, the image data of the unique image does not remain in the image processing apparatus. Accordingly, personal information recorded in the information medium is not leaked from the image processing apparatus.

In addition, when the card shot function is executed, the control section 7 prohibits the execution of the filing mode for storing the inputted image data in the storage section 4. Hereby, the image data of the unique image is not stored, thereby preventing personal information from leaking out of the image processing apparatus.

It should be noted that the present invention is not limited to the above embodiments, but obviously many modifications and changes can be made to the above embodiments without departing from the scope of the invention. When the type of the information medium is identified, the user may directly enter the size through the operating section instead of letting the size calculated from the inputted image. Alternatively, when the card shot function is indicated, the control section displays a list of information media in the display section, and when the user selects the information medium, the control section may identify the type of the information medium.

When the size is calculated from the inputted image, and when there are a plurality of information media with the same size, the control section displays a list of information media with that size. When the user selects his/her desired information medium from this list, the control section identifies the type of the designated information medium.

Image inputted from the information medium may include an image of the information medium scanned by an external apparatus, or an image for the information medium created by the external apparatus. In this case, the image is inputted from the external apparatus through data communication.

What is claimed is:

1. An image processing apparatus, comprising:
an input section for inputting an image having a unique image from an information medium;
a management table that stores information on each type of information medium;
a control section for performing image processing on the inputted image and outputting the image;
an identification section for obtaining a size of the information medium based on the inputted image of the information medium, and identifying the type of the information medium by comparing the size of the information medium with the information stored in the management table; and
an area determination section for determining a specific area in which the unique image exists based on the type of the information medium; and
an authentication section for authenticating a user,
wherein the area determination section determines the specific area to be masked according to a security level of the user, such that the higher the security level, the less of the specific area is to be masked, whereas the lower the security level, the more of the specific area is to be masked, and
the control section performs image processing for masking the specific area.

2. The image processing apparatus according to claim 1, wherein the specific area is determined according to the type of the information medium, the management table stores information medium management information on the size of the information medium for each type thereof, the shape of the unique image, and the position of the specific area, and when the type of the information medium is identified, the area determination section determines, by comparing the information in the management table, the position of the specific area in the inputted image of the information medium.

3. The image processing apparatus according to claim 1, further comprising a display section for displaying the specific area, wherein the specific area displayed in the display section is changeable and the control section masks the specific area after change.

4. The image processing apparatus according to 1, wherein the security level is changeable after the image is inputted.

5. The image processing apparatus according to claim 1, wherein the security level of the unique image is assigned according to the type of the information medium and the area determination section determines the specific area according to the security level of the unique image.

6. The image processing apparatus according to claim 1, wherein the security level of the unique image is assigned according to the type of the information medium and the area determination section determines the specific area based on the security level of the user and the security level of the unique image, whichever higher.

7. The image processing apparatus according to claim 1, wherein when image processing for masking the specific area is executed, the control section prohibits the creation of log information related to this processing.

8. The image processing apparatus according to claim 1, wherein when image processing of masking the specific area is executed, the control section prohibits the storing of the image having the inputted unique image.

9. The image processing apparatus according to claim 1, wherein the information medium has an image indicating personal information as the unique image on the surface thereof; and the input section scans the surface of the information medium and inputs the image.

10. The image processing apparatus according to claim 1, wherein the information medium has an image on the front and back sides thereof; and the input section scans both sides of the information medium and inputs the images; and the control section synthesizes both sides of images and outputs two images side by side.

* * * * *